United States Patent [15] 3,689,729
Neward et al. [45] Sept. 5, 1972

[54] ELECTRODE FOR ELECTRICAL DISCHARGE MACHINING

[72] Inventors: George A. Neward; Joseph F. Novek, both of Rochester, N.Y.

[73] Assignee: Mor-Wear Tools, Inc., Rochester, N.Y.

[22] Filed: Dec. 4, 1969

[21] Appl. No.: 882,023

[52] U.S. Cl. ................... 219/69 E, 204/3, 204/38 S, 204/143 M, 204/290, 29/194
[51] Int. Cl. ......... C23f 7/00, C23f 17/00, B01k 3/04
[58] Field of Search .................. 204/3–9, 290, 288, 204/143 M, 156, 38 S; 219/69 E, 69 M; 29/194

[56] References Cited

UNITED STATES PATENTS

| 2,092,880 | 9/1937 | Hunter et al. | 204/5 |
| 3,550,991 | 12/1970 | Wesoloski | 204/9 |
| 387,774 | 8/1888 | Diehl | 204/4 |
| 1,612,605 | 12/1926 | Buenaventura | 204/4 |
| 2,172,563 | 9/1939 | Libberton | 204/8 |
| 899,852 | 9/1908 | Warner | 204/8 |
| 2,861,164 | 11/1958 | Stegler | 219/69 E |

Primary Examiner—John H. Mack
Assistant Examiner—R. L. Andrews
Attorney—Charles Shepard and Stonebraker & Shepard

[57] ABSTRACT

An electrode for electrical discharge machining is made by providing a mould shaped to the desired shape wanted for the final article. The mould cavity is electroplated. Before the plating layer is removed from the mould cavity, it is backed up by a strong alloy having substantially the same coefficient of thermal expansion as the electroplate layer, the alloy being, for example, an alloy of bismuth and tin, poured into the mould cavity over the electroplated layer and around anchoring pins which depend into the cavity from a rigid locating bar mounted on the mould. When the alloy has solidified, the composite structure comprising the electroplate layer, the back-up strengthening alloy, the anchoring pins, and the locating bar, is removed as a unit from the mould, and is made ready for mounting on a conventional electrical discharge machine, to make duplicates of the original mould by the known electrical discharge machining process. The back-up alloy prevents the warping of the electroplate layer which frequently occurs when the electrode is made by prior methods.

7 Claims, 1 Drawing Figure

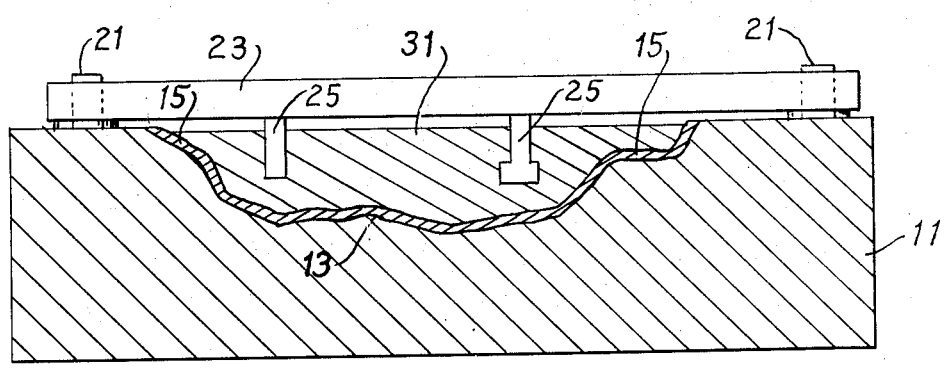

ELECTRODE FOR ELECTRICAL DISCHARGE MACHINING

BACKGROUND OF THE INVENTION

In the well-known process of electrical discharge machining (commonly referred to as EDM) a mould is first made, having the shape desired for the finished article. It is then necessary to make an electrode which is a reverse duplicate of the mould cavity, which electrode can then be mounted on an EDM machine and can be engaged with a suitable workpiece to form the workpiece, by electrical discharge or spark discharge, into a reverse duplicate of the electrode, thus forming it into a direct duplicate of the original mould.

The most convenient way to make the electrode as a reverse duplicate of the original mould, is to electroplate the mould cavity, and then use the electroplating (that is, the electroplated layer) as the working surface of the electrode. It is found in practice, however, that when the electroplated layer is removed from the mould cavity, it frequently becomes warped or distorted, so that it is no longer a true reverse duplicate or reproduction of the mould cavity. The final work produced by use of the electrode will therefore not be a true reproduction of the mould.

This warpage or distortion of the electroplated layer, upon removal from the mould, is avoided according to the present invention by backing up the electroplating in the mould cavity by a suitable alloy, before removing it from the mould cavity. Locating pins on a rigid locating bar are preferably embedded in the back-up alloy.

An object of the invention is the provision of a generally improved and more satisfactory electrode for use in electrical discharge machining.

Another object is the provision of a generally improved and more satisfactory method for making an electrode for use in electrical discharge machining.

Still another object is the provision of an electrode, and a method of making the same, in which the operating surface of the electrode is a true and accurate reproduction in reverse of the mould cavity from which it is made, without warpage or distortion.

A further object is the provision of a relatively simple and inexpensive process or method for making a true and distortion-free electrode for EDM use.

BRIEF DESCRIPTION OF THE DRAWING

The single FIGURE of the drawing is a schematic section through a mould with the completed electrode therein, before removal from the mould cavity.

DESCRIPTION OF THE PREFERRED EMBODIMENT

Referring now to the drawing, there is shown at 11 a mould having a cavity 13 which has been formed, in any suitable known way, to the exact shape which is to be reproduced on one or a number of finished articles. Frequently, but not necessarily, the mould is made of relatively soft material which can be easily worked and shaped to the desired finished shape, whereas the final article to be produced is to be made of hard material.

The mould cavity 13 is electroplated by conventional known techniques, the details of which are not important for purposes of the present invention. It is sufficient to say that at the completion of the conventional electroplating step, the mould cavity has been plated with a layer 15 of copper or a suitable copper alloy, as conventionally used when making EDM electrodes. A thin release layer of conventional kind may be used between the electroplated layer 15 and the mould cavity surface 13, if desired, to make it easier to separate the completed electroplated layer from the mould cavity.

In conventional production of EDM electrodes as customarily made in the past, the electroplated layer 15 is removed from the mould 11 at this point, and is subjected to subsequent conventional steps to make the electrode. However, it is found in practice that the layer 15 frequently warps or becomes distorted, during removal from the mould cavity or during subsequent handling while completing the manufacture of the electrode. If it does become distorted, then of course it is no longer a true reverse duplicate or reproduction of the mould cavity, and any work manufactured by the use of this electrode will not be a true reproduction of the mould cavity.

According to the present invention, the electroplated layer 15 is not removed from the mould cavity at this point, but is backed by a strengthening back-up alloy while it still remains undisturbed in the mould cavity. Preferably also anchoring pins on a rigid locating bar are embedded in the back-up alloy.

The mould 11 is preferably provided with any desired number of locating pins 21 in the exact relative locations of similar locating pins on the conventional EDM machine with which the electrode is later to be used. One or more locating bars 23 of strong and rigid material, such as steel, are impaled on these locating pins 21 (after the electroplating step has been completed) and the locating bars 23 are provided with any desired number of anchoring pins 25 projecting somewhat into the mould cavity.

When this anchoring assembly has been placed in proper position on the mould, molten back-up alloy is poured into the mould cavity, on top of the electroplated layer 15, and around the anchoring pins 25, the alloy being shown at 31. The back-up alloy may be of various compositions, but preferably it is an alloy having a coefficient of thermal expansion substantially the same as or close to the coefficient of thermal expansion of the electroplated copper layer 15.

A very satisfactory and suitable alloy for use as the strengthening or back-up alloy 31 is an alloy of 58 percent bismuth and 42 percent tin. This alloy is commercially available on the market under the trade name "Cerrotru."

When this alloy hardens, it has good adhesion to the copper plate layer 15, and tightly grips the anchoring pins 25 on the anchoring and locating bar 23. After solidification and cooling to room temperature, the locating bar 23 may be lifted vertically up, off of the pins 21, bringing the solidified alloy 31 and the adhering electroplating 15 with it. The bar 23 is then impaled on the corresponding locating pins of the EDM apparatus, and the apparatus is operated in the normal conventional way, using this composite structure 15, 23, 31, etc., as the electrode for producing, in one or more workpieces, a finished article having a machined shape which is an exact duplicate of the shape of the original cavity in the original mould 11. The electrode is accurate, since the warping and distortion which occurs so frequently in electrodes made according to the prior practice, are completely eliminated.

The member 11 has been referred to above as a mould, but it can just as well be called a pattern, and the surface of the mould cavity to which the electroplate layer 15 is applied can conveniently be called the pattern surface. It may be noted that the strengthening or back-up alloy 31 applied to the electroplate layer 15 is relatively massive or thick and rigid as compared to the thickness and rigidity of the electroplate layer 15. Of course the thickness of the alloy at any given point depends somewhat on the shape of the pattern surface or mould cavity, but even when the pattern surface is relatively flat, the alloy preferably has a minimum thickness of several times (say 10 times) the thickness of the electroplate layer.

We claim:

1. The method of making an electrode for use in electrical discharge machining, which comprises the steps of providing a pattern surface of the shape desired in a finished article, electroplating such surface to form a conducting electroplate layer thereon, providing a rigid bar bridging over the pattern surface and having anchoring members projecting from the bar toward the electroplate layer in position to become embedded in back-up alloy when such alloy is applied, applying a molten body of strengthening back-up alloy to the face of said electroplate layer which is remote from said pattern surface while said electroplate layer remains in its undisturbed original position on said pattern surface, said molten alloy surrounding portions of said anchoring members, cooling the molten alloy to solid state, and then removing the electroplate layer and the solidified alloy and said rigid bar and anchoring members as a unit from said pattern surface.

2. The method as defined in claim 1, wherein the alloy applied to said electroplate layer is relatively thick and rigid as compared to the thickness and rigidity of the electroplate layer.

3. The method as defined in claim 1, wherein said alloy has a coefficient of thermal expansion close to that of said electroplate layer.

4. The method as defined in claim 1, wherein said alloy is an alloy mainly of bismuth and tin.

5. The method as defined in claim 4, wherein said alloy is composed essentially of substantially 58 percent bismuth and 42 percent tin.

6. An electrode for use in electrical discharge machining, comprising a layer of conducting material having a front face in the shape of a reverse duplicate of the shape to which a workpiece is to be machined, a strengthening back-up layer of alloy having a coefficient of thermal expansion similar to that of said conducting material and intimately engaged with a rear face of said conducting layer, a relatively rigid locating bar, and anchoring members projecting from the bar toward said conducting layer and embedded firmly in said back-up layer of alloy.

7. An electrode as defined in claim 6, in which said alloy is composed essentially of substantially 58 percent bismuth and 42 percent tin.

* * * * *